United States Patent [19]

Halpaap et al.

[11] Patent Number: 5,883,216
[45] Date of Patent: Mar. 16, 1999

[54] BLOCKED POLYISOCYANATES CONTAINING AMIDE/IMIDE GROUPS AND THEIR USE IN STOVING LACQUERS

[75] Inventors: Reinhard Halpaap, Odenthal; Hans Schlegel, Leverkusen; Jan Mazanek, Köln; Hans-Ulrich Meier-Westhues, Leverkusen, all of Germany

[73] Assignee: Bayer Aktiengesellschaft, Leverkusen, Germany

[21] Appl. No.: 671,282

[22] Filed: Jun. 27, 1996

[30] Foreign Application Priority Data

Jul. 5, 1995 [DE] Germany ............ 195 24 437.0

[51] Int. Cl.$^6$ ............ C08G 18/80; C08G 18/40; C09D 175/04; C07C 230/00
[52] U.S. Cl. .......... 528/45; 252/182.2; 252/182.22; 252/182.24; 528/49; 528/59; 528/60; 528/65; 528/67; 528/73; 528/84; 528/85; 560/24; 560/25; 560/26; 560/115; 560/157; 560/158; 560/330; 560/359; 560/360; 564/123; 564/138
[58] Field of Search .............. 252/182.2, 182.22, 252/182.24; 528/45, 49, 67, 73, 84, 85; 560/25, 26, 24, 115, 157, 158, 330, 359, 360; 564/123, 138

[56] References Cited

U.S. PATENT DOCUMENTS

| | | | |
|---|---|---|---|
| 3,625,911 | 12/1971 | Redman et al. | 528/45 |
| 3,652,471 | 3/1972 | Sattler | 524/323 |
| 3,658,773 | 4/1972 | Zecher et al. | 528/45 |
| 3,697,480 | 10/1972 | Schade et al. | 528/45 |
| 4,431,758 | 2/1984 | Osada et al. | 524/104 |
| 4,444,845 | 4/1984 | Dünwald | 428/422.8 |
| 4,448,844 | 5/1984 | Osada et al. | 428/375 |
| 4,472,567 | 9/1984 | Zecher et al. | 528/52 |
| 4,546,162 | 10/1985 | Zecher et al. | 528/67 |
| 4,740,576 | 4/1988 | Reiter et al. | 528/45 |
| 4,853,261 | 8/1989 | Dünwald et al. | 427/388.1 |
| 4,954,577 | 9/1990 | Dünwald et al. | 525/420 |
| 4,997,891 | 3/1991 | Cicero et al. | 525/424 |
| 5,126,422 | 6/1992 | Halpaap et al. | 528/45 |
| 5,126,479 | 6/1992 | Dünwald et al. | 560/334 |
| 5,219,657 | 6/1993 | Ueoka et al. | 428/379 |

FOREIGN PATENT DOCUMENTS

| | | |
|---|---|---|
| 3817614 | 8/1989 | Germany . |
| 1468700 | 3/1977 | United Kingdom . |
| 2037788 | 7/1980 | United Kingdom . |

OTHER PUBLICATIONS

S. Darling, International Wire Standards—Progress Towards Harmonisation in Proceedings 19th EEI Conference, Chicago, 25–28 Sep. 1989, p. 56.

*Primary Examiner*—Rabon Sergent
*Attorney, Agent, or Firm*—Joseph C. Gil; Thomas W. Roy

[57] ABSTRACT

The present invention relates to polyisocyanates containing i) 0.5 to 10 wt. % of amide and/or imide structural units (calculated as —CO—N=, MW=42),
ii) 5 to 20 wt. % of isocyanate groups (calculated as —NCO, MW=42) blocked with blocking agents which are monofunctional in the context of the isocyanate addition reaction and
iii) 0 to 30 wt. % of chemically incorporated urethane groups (calculated as —NH—CO—O—, MW=59) obtained from the reaction of isocyanate groups with the hydroxyl groups of organic polyhydroxyl compounds.

The present invention also relates to a process for the production of these lacquer polyisocyanates, their use as a binder for stoving lacquers optionally in combination with organic polyhydroxyl compounds and to their use as a binder component containing free hydroxyl groups and optionally blocked isocyanate groups by reacting and/or blending the polyisocyanates with organic polyhydroxyl compounds having a molecular weight of 62 to 350.

9 Claims, No Drawings

BLOCKED POLYISOCYANATES CONTAINING AMIDE/IMIDE GROUPS AND THEIR USE IN STOVING LACQUERS

BACKGROUND OF THE INVENTION

1. Field of the Invention

The present invention relates to novel lacquer polyisocyanates with blocked isocyanate groups, which are characterized by the presence of amide and/or imide structural units, to a process for the production of these lacquer polyisocyanates and to the use thereof in combination with organic hydroxyl compounds as a stoving lacquer or for the production of a stoving lacquer.

2. Description of the Prior Art

It has been known for many years to produce lacquer coated wires using polyurethane-based wire coating compositions, such that the wires could be soldered at comparatively low temperatures of approximately 370° to 390° C. The binders of these wire coating compositions were based upon combinations of polyester polyols and phenol- or alkanol-blocked polyisocyanates (DE-AS 1,170,096 or DE-AS 2,626,175). Solderability may be improved by increasing the urethane group content in the polymer film by combining blocked polyisocyanates with hydroxy-functional oligourethanes (DE-OS 1,644,794).

These polyurethane coating compositions for wire are widely used for the production of easily solderable, lacquer coated copper wires, but they are not usable in all applications because they have only moderate thermal stability (temperature index TI according to IEC 172 of 130 to 155° C., IEC=International Electrotechnical Commission). The temperature classes or indices of the insulating materials for wire lacquers are stated, for example, in S. Darling, *International Wire Standards—Progress Towards Harmonisation* in Proceedings 19th EEI Conference, Chicago, 25–28 September 1989, page 56.

It is also known to provide metal wires with coatings having much better long-term thermal stability (temperature index TI according to IEC 172 of approximately 180° C.). The coating compositions used for the production of these lacquer coatings are based not on polyurethanes, but instead on heat resistant plastics, such as polyhydantoins (for example FR-PS 1,484,694, DE-PS 2,460,206), polyamide-imides (for example DE-OS 3,544,548, DE-OS 3,714,033, DE-OS 3,817,614) or polyester-amideimides (for example U.S. Pat. No. 3,652,471, U.S. Pat. No. 4,997,891, DE-PS 3,249,497). However, none of the wires coated with wire coating compositions based on these plastics is solderable at below 400° C. While the S. Darling publication does describe polyesterimides having a temperature index TI of 180° C. as "solderable" (brazeable, solderable), such solderability according to IEC 851 is only achieved at temperatures of above 400° C. The requirements for various types of lacquer coated wires are described in IEC 317. In this document, a soldering temperature of 470° C. is, for example, set forth for solderable polyesterimides having a temperature index of 180° C. (IEC 317, part 23).

Polyesterimides having an increased hydroxyl group content in combination with heat resistant blocked polyisocyanates are solderable at 370° C., but, in comparison with conventional polyesterimides, exhibit sharply decreasing properties with regard to the tan δ critical point and softening temperature. The amideimide/polyurethane combinations described in EP 365,877 also exhibit similar disadvantages.

Polyisocyanates containing carbodiimide and/or uretone-imine groups and their use for in wire coating compositions are disclosed in EP-B 231,509. Depending upon the reaction partner, these polyisocyanates are suitable for the production of solderable lacquer coated wires (example 1 in EP-B 231,509) or heat-resistant lacquer coated wires (example 3 in EP-B 231,509).

Lacquer binders constituting mixtures of very specific polyamideimides based on trimellitic anhydride and the specific blocked polyisocyanates according to EP-B 231,509 are also known and, according to EP-A 291,699, yield highly heat resistant films.

It is also already known to use low molecular weight additives in binder systems based on blocked isocyanates in order to improve technical properties. According to EP-A 287,947, heat resistant lacquer coated wires are obtained by using unsaturated carboxylic acids in combination with polyisocyanates containing carbodiimide and/or uretone-imine groups. Using N,N',N"-tris-(2-hydroxyethyl)-isocyanurate as an additive for polyurethane-based wire lacquers also provides heat resistant lacquer coated wires (DE-OS 3,133,571).

In summary, it is apparent that the prior art is directed to obtaining lacquer coatings with elevated heat resistance (temperature index TI approximately 180° C.) or lacquer coated wires which are solderable at a comparatively low temperature (approximately 370° C.).

An object of the present invention is to provide a coating composition for heat resistant substrates, in particular for wire coating, which combines both of these advantages, i.e., elevated heat resistance and solderability at comparatively low temperatures. Wires, which are coated with coating compositions according to the invention, should in particular be solderable at approximately 370° C. according to IEC 851 and should have a temperature index TI according to IEC 172 of at least 180° C. In addition, the remaining properties should match the properties of known wire coating compositions or the resulting coated wires to the extent possible.

This object may be achieved with the lacquer polyisocyanates described below in greater detail or with their use in combination with organic polyhydroxyl compounds in stoving lacquers, in particular for wire coatings.

SUMMARY OF THE INVENTION

The present invention relates to polyisocyanates containing i) 0.5 to 10 wt. % of amide and/or imide structural units (calculated as —CO—N=, MW=42), ii) 5 to 20 wt. % of isocyanate groups (calculated as —NCO, MW=42) blocked with blocking agents which are monofunctional in the context of the isocyanate addition reaction and iii) 0 to 30 wt. % of chemically incorporated urethane groups (calculated as —NH—CO—O—, MW=59) obtained from the reaction of isocyanate groups with the hydroxyl groups of organic polyhydroxyl compounds.

The present invention also relates to a process for the production of these polyisocyanates by reacting a) organic polyisocyanates having an average NCO functionality of at most 2.6 and a molecular weight of 140 to 500 with b) monofunctional blocking agents for isocyanate groups, c) compounds having at least two carboxyl and/or carboxylic anhydride groups and a molecular weight of 90 to 400 and d) optionally organic polyhydroxyl compounds having a molecular weight of 62 to 3000, wherein i) blocking agent b) is used in a quantity sufficient to block 20 to 95% of the isocyanate groups of component a), ii) components c) and d) are used in amounts sufficient to provide an equivalent ratio of free isocyanate groups present after the blocking reaction to the sum of carboxyl, carboxylic anhydride and hydroxyl groups of 0.5:1 to 1.05:1 and iii) the equivalent ratio of the sum of carboxyl and carboxylic anhydride groups of component c) to the hydroxyl groups of component d) is 1:0 to 1:20.

The present invention further relates to stoving lacquers containing, as binder, the polyisocyanates according to the invention and sufficient amounts of organic polyhydroxyl compounds such that the equivalent ratio of i) blocked isocyanate groups of the polyisocyanates to ii) the sum of the hydroxyl groups optionally present in the polyisocyanates and the hydroxyl groups of the polyhydroxyl compounds is 2:1 to 1:1.2.

Finally, the present invention relates to compounds containing free hydroxyl groups and optionally blocked isocyanate groups, which are suitable for use as binder components and which are prepared by reacting and/or blending the polyisocyanates according to the invention with sufficient amounts of organic polyhydroxyl compounds having a molecular weight of 62 to 350 to provide an equivalent ratio of i) blocked isocyanate groups of the polyisocyanates to ii) the sum of hydroxyl groups optionally present in the polyisocyanates and the hydroxyl groups of the polyhydroxyl compounds of 1:1.21 to 1:3.

DETAILED DESCRIPTION OF THE INVENTION

All molecular weights relating to component a) are number average molecular weights, which may be calculated from the NCO content and average NCO functionality. All molecular weights relating to component d) are number average molecular weights, which may be calculated from the hydroxyl group content and average hydroxyl functionality.

To prepare the lacquer polyisocyanates with blocked isocyanate groups according to the invention, starting polyisocyanates a) are reacted in an isocyanate polyaddition reaction with blocking agents b), polyfunctional carboxyl and/or carboxylic anhydride compounds c) and optionally organic polyhydroxyl compounds d). In addition to the formation of urethane groups from isocyanate groups and hydroxyl groups, the phrase "isocyanate polyaddition reaction" also means the addition of isocyanate groups onto carboxylic anhydride groups to from amide or imide structural units with elimination of $CO_2$. "Blocked isocyanate groups" refers to reaction product of isocyanate groups with blocking agents b), which are monofunctional in the context of the isocyanate addition reaction. In defining the number of "urethane groups" present in the lacquer polyisocyanates, only urethane groups formed from the reaction of isocyanate groups with the hydroxyl groups of organic polyhydroxyl compounds d) are included. Urethane groups formed by reaction of the blocking agents with isocyanate groups are not included.

Blocking agent b) is present in an amount sufficient to block 20 to 95%, preferably 35 to 90% and more preferably 50 to 85% of the isocyanate groups present in starting polyisocyanates a). Components c) and d) are present in an amount such that the equivalent ratio of the isocyanate groups of component a) remaining after the blocking reaction to the sum of carboxyl, carboxylic anhydride and hydroxyl groups is 0.5:1 to 1.05:1, preferably 0.7:1 to 1.0:1, and such that the equivalent ratio of the sum of carboxyl and carboxylic anhydride groups of component c) to hydroxyl groups of component d) is 1:0 to 1:20, preferably 1:0 to 1:6 and more preferably 1:0.

Preferably, the equivalent ratio of the isocyanate groups of component a) remaining after the blocking reaction to the sum of carboxyl and carboxylic anhydride groups of component c) is at least 1:1 and preferably 1:1. If starting component d) is used in an amount such that the equivalent ratio of the isocyanate groups of component a) remaining after the blocking reaction to the sum of carboxyl, carboxylic anhydride and hydroxyl groups of components c) and d) is below 1:1, it must be ensured during the reaction that there is at least one free NCO group available for each carboxyl and/or carboxylic anhydride group. This may be achieved if component d) or at least the partial excess quantity of d) is not added to the reaction mixture until component c) has reacted.

Suitable starting polyisocyanates a) are selected from aromatic, aliphatic or cycloaliphatic polyisocyanates having an average molecular weight of 140 to 500 and an average NCO functionality of at most 2.6, preferably of 2 to 2.2. Examples include 1,4-phenylene diisocyanate, 2,4- and/or 2,6-diisocyanatotoluene (TDI), 4,4'-, 2,4'- and/or 2,2'-diisocyanato-diphenylmethane (MDI) or mixtures of these isomers with their higher homologs obtained in known manner by the phosgenation of aniline/formaldehyde condensation products, 1,5-naphthylene diisocyanate, 1,4-butane diisocyanate, 2-methylpentane-1,5-diisocyanate, 1,5-hexane diisocyanate, 1,6-hexane diisocyanate (HDI), 1,3- and/or 1,4-cyclohexane diisocyanate, 2,4- and/or 2,6-diisocyanato-1-methylcyclohexane, 3,5,5-trimethyl-3-isocyanatomethylcyclohexane isocyanate (IPDI), dicyclohexyl-methane 2,4'- and/or 4,4'-diisocyanate and mixtures of these diisocyanates.

Preferred starting polyisocyanates a) are those having aromatically bound isocyanate groups of molecular weights of 174 to 300. More preferred diisocyanates are 2,4-diisocyanatotoluene and 2,6-diisocyan-atotoluene and the commercial mixtures of these isomers; 4,4'-, 2,4'- and 2,2'-diisocyanato-diphenylmethane and mixtures of these isomers or mixtures of these isomers with their higher homologs, which may be obtained in a known manner by the phosgenation of aniline/formaldehyde condensation products; and mixtures of the preceding aromatic polyisocyanates.

Suitable blocking agents b) are selected from the known monofunctional blocking agents for isocyanate groups having a molecular weight of 60 to 300, preferably of 87 to 160, e.g., those described in Z. W. Wicks, *Progress in Organic Coatings* 3, 73 et seq. (1975) and 9, 3 et seq. (1981). Suitable blocking agents b) include phenol, cresol, xylenol and the commercial isomeric mixtures thereof, isopropanol, cyclohexanol, 1-methoxy-2-propanol (MP), diethylene glycol monomethyl ether, benzyl alcohol, butanone oxime, cyclohexanone oxime, ε-caprolactam and mixtures thereof. Phenols, aliphatic alcohols, oximes and lactams are preferred. Phenols, cresols or xylenols are particularly preferred.

Suitable compounds c) having at least two carboxyl and/or carboxylic anhydride groups are selected from those having a molecular weight of 90 to 400, such as maleic acid, fumaric acid, succinic acid, glutaric acid, adipic acid, isophthalic acid, terephthalic acid, trimellitic anhydride, pyromellitic anhydride, naphthalene-tetracarboxylic anhydride and benzophenonetetra-carboxylic anhydride. Trimellitic anhydride and pyromellitic anhydride are particularly preferred.

Diols and/or triols having a molecular weight of 62 to 350 are preferably used as optional polyhydroxyl compounds d), although higher molecular weight polyhydroxyl compounds having a molecular weight of greater than 350 to 3000 may also be used.

Suitable polyhydroxyl compounds having a molecular weight of 62 to 350 include ethylene glycol, the isomeric propanediols, butanediols and hexanediols, di-, tri- or tetraethylene glycol, di-, tri- or tetrapropylene glycol, neopentyl glycol, 2-ethyl-1,3-hexanediol, 2,2,4-trimethyl-1,3-pentanediol, 1,4-bis(hydroxymethyl)cyclohexane, 2,2-bis(4-hydroxycyclohexyl)propane, glycerol, hexanetriol, N,N',N"-tris(2-hydroxyethyl) isocyanurate (THEIC) and pentaerythritol.

Higher molecular weight polyhydroxyl compounds include the known polyhydroxy polyesters, which may be obtained by reacting dicarboxylic acids such as phthalic acid, isophthalic acid, terephthalic acid and adipic acid with an excess of the previously disclosed polyols. Known polyhydroxy polyethers, which may be obtained by alkoxylating low molecular weight starter molecules, may also be used as the higher molecular weight polyols, although they are less preferred. It is also possible to use mixtures of the previously disclosed starting materials in accordance with the present invention.

When performing the process according to the invention, starting materials b), c) and optionally d) may be reacted in any desired sequence with polyisocyanate component a); however, care should be taken to ensure that when component c) is added, no hydroxyl groups (any longer) remain which are capable of reacting with carboxyl groups,and in particular anhydride groups, to form ester group. The formation of urethane, amide and imide groups is preferred over the formation of ester groups. For this reason, the process is preferably performed in such a manner that component a) is initially reacted with component b) and optionally component d), before component c) is incorporated into the reaction mixture. Even in accordance with this embodiment, there must be at least one free isocyanate group of component a) available for each carboxyl and anhydride group of component c) as previously stated. The reactions are generally performed at temperature of 20° to 200° C., preferably of 60° to 180° C.

The process according to the invention is generally performed in solution, but, depending upon the desired properties of the finished product, such as degree of branching and melt viscosity, it is possible to perform the process in a melt.

Suitable solvents include the known lacquer solvents, which are inert towards isocyanate groups, such as ethyl acetate, butyl acetate, ethylene glycol monomethyl ether acetate, ethylene glycol monoethyl ether acetate, 1-methoxy-2-propyl acetate, 2-butanone, 4-methyl-2-pentanone, cyclohexanone, toluene, xylene, solvent naphtha and mixtures thereof. Also suitable as solvents, but less preferred, are plasticizers such as those based on esters of phosphoric acid, sulphonic acid or phthalic acid. In addition to lacquer solvents, which are inert towards NCO groups, it is also possible to use a minor portion of NCO-reactive solvents. These solvents are not added until the reaction is complete or substantially complete, i.e., when the NCO content is $\leq 1\%$ preferably $\leq 0.5\%$. This essentially means that the lacquer polyisocyanates produced substantially in the absence of reactive solvents may be dissolved in these solvents once they have been produced. Preferred reactive solvents are monofunctional, aliphatic, cycloaliphatic or araliphatic alcohols and also phenols, such as isopropanol, n-butanol, n-octanol, 2-methoxyethanol, 2-ethoxy-ethanol, diethylene glycol monomethyl ether, diethylene glycol monoethyl ether and 1-methoxy-2-propanol; cycloalkanols such as benzyl alcohols; and phenols such as cresol or xylenol.

Since these reactive monohydric alcoholic or phenolic solvents are also suitable as blocking agents, it is clear that these solvents, when present, are not included in the calculation of the quantity ratios of reactants a) to d), but are only used as solvents after the reaction according to the invention is substantially complete.

According to a preferred embodiment of the process according to the invention, starting diisocyanate a) is blocked using the disclosed amounts of blocking agent b). Depending upon the nature of the blocking agent, blocking is performed at a temperature of 20° to 200° C., preferably 60° to 160° C., until the product has the theoretical NCO content or slightly below. Once blocking is complete, solvent is added if a dissolved finished product is to be produced and, in a second reaction stage, the partially blocked diisocyanate is reacted with the component c) containing carboxyl and/or carboxylic anhydride groups, preferably trimellitic anhydride, at a temperature of 60° to 200° C., preferably 100° to 180° C., wherein $CO_2$ is evolved. The reaction is monitored by measuring the evolved $CO_2$ by means of a connected gas meter. The evolved $CO_2$ is a measure of the amide and/or imide groups which have been formed. The reaction is complete when no further $CO_2$ evolution is observed and the product has the theoretical NCO content or slightly below. If the optional polyhydroxyl component d) is used, it is introduced into the reaction before, during or after the reaction of component a) with component b) according to the preferred embodiment, or it is introduced into the reaction in a subsequent stage once component a) has reacted with components b) and c). The reaction is complete once the free isocyanate group content of the reaction mixture has fallen to a value of less than 1.0 wt. %, preferably less than 0.5 wt. %.

According to this preferred embodiment of the process, the lacquer polyisocyanates according to the invention are produced as clear solutions in lacquer solvents or as solvent-free resins, which generally solidify from the melt as a solid resin.

If dissolved products are produced, the solvent or solvent mixture may be added as described in the preferred embodiment, for example after blocking; however, in other embodiments of the process, it is possible to perform the initial blocking stage of the reaction in the presence of a suitable solvent or, alternatively, component c) containing carboxyl and/or carboxylic anhydride groups is added together with the solvent and reacted.

In another embodiment of the process according to the invention polyisocyanate a), blocking agent b) and the compound c) containing carboxyl and/or carboxylic anhydride groups are heated together in a single vessel reaction. The preferably used phenolic blocking agent reacts at a temperature 90° to 120° C. and the reaction with component c) with evolution of $CO_2$ to yield the amide/imide proceeds at a temperature of 120° to 160° C. The individual reaction stages overlap and may generally be monitored by NCO content titration, measurement of the quantity of $CO_2$ evolved and optionally by the liberated heat. The reaction with optional polyol d) is conducted before and/or after the described single vessel reaction. However, it is possible in certain cases, but not preferred to react polyisocyanate a) simultaneously with components b), c) and d).

The lacquer polyisocyanates according to the invention constitute valuable reaction partners for organic polyhydroxyl compounds and may be used in combination with these polyhydroxyl compounds as a stoving lacquer or for the production of stoving lacquers for any desired heat resistant substrates. Suitable polyhydroxyl compounds for the production of such lacquers include the compounds set forth under 1 to 5 below or any desired mixtures of these compounds.

1. Low molecular weight polyhydric alcohols having a maximum molecular weight of 350 and a hydroxyl functionality of 2 to 4, e.g., the polyols previously disclosed for use as polyol d) and also 2,2-bis[4-(2-hydroxy-ethoxy)phenyl]propane, 2,2-bis[4-(2-hydroxypropoxy)-phenyl]propane, maleic acid bis-ethylene glycol ester and adipic acid bis-ethylene glycol ester.

2. Higher molecular weight polyhydroxyl polyesters having an OH number of 25 to 600, preferably of 40 to 400 mg KOH/g, which may be obtained by reacting polybasic carboxylic acids, such as adipic acid, phthalic acid, tetrahydrophthalic acid, hexahydrophthalic acid or their anhydrides with excess quantities of the polyhydric alcohols set forth in 1 above, and which have a molecular weight, which may be calculated from the OH content and OH functionality, of greater than 350.

3. Oligourethanes having an OH number of 50 to 400, preferably 80 to 250 mg KOH/g, which have aliphatically attached hydroxyl groups, differ from alcohols 1), and which may be obtained by reacting the alkanediols or alkanetriols set forth in 1 above (which may optionally contain ether groups) with substoichiometric quantities of the diisocyanates previously set forth as being suitable for use as polyisocyanate component a) and those described in DE-PS 1,644,794 and GB-PS 1,195,886.

4. Copolymers which have an OH number of 20 to 200, preferably 60 to 200 mg KOH/g, contain hydroxyl groups, differing from alcohols 1), and may be obtained by copolymerizing, for example, hydroxyalkyl acrylates or methacrylates with acrylic or methacrylic alkyl esters, optionally together with other olefinically unsaturated monomers such as styrene and/or may be obtained according to DE-OS 2,137,239 from styrene/maleic acid copolymers by partial esterification of the acid groups with ethylene oxide.

5. Polycarbonates, which are known, have an OH number of 50 to 650, preferably 100 to 450 mg KOH/g, differ from alcohols 1), and may be obtained, for example, by reacting diols such as 1,3-propanediol, 1,4-butanediol and/or 1,6-hexanediol, di-, tri- and/or tetraethylene glycol with phosgene or diaryl carbonates such as diphenyl carbonate, preferably polycarbonates based on 1,6-hexanediol optionally together with approximately 5 to 35 mol. %, based on the total moles of diols, of other diols. Polycarbonates based on $HO(CH_2)_6$—O—CO—$(CH_2)_5$—OH may also be used.

The compounds set forth in 2 and 3 are the preferred reaction partners for the lacquer polyisocyanates according to the invention for the production of stoving lacquers. However, in addition to the reaction partners previously set forth, other compounds capable of reacting with isocyanate groups may also be present in the stoving lacquers, although this is generally less preferred. Compounds which may be mentioned in this connection include oligomeric epoxides containing hydroxyl groups, imide esters, imide ester amides, hydantoins and compounds containing amino groups such as hexamethylene diamine, melamine/formaldehyde resins or aminopolyethers.

The macroscopic properties of the coatings obtained from the stoving lacquers may be varied by selecting the molecular weight of the polyhydroxyl compounds to be used. Using higher molecular weight polyhydroxyl compounds generally results in more elastic coatings, while using low molecular weight polyhydroxyl compounds results in harder coatings.

In one use according to the invention, the lacquer polyisocyanates are combined with polyhydroxyl compounds in amounts such that the equivalent ratio of i) blocked isocyanate groups of the lacquer polyisocyanates to ii) the sum of the hydroxyl groups optionally present in the lacquer polyisocyanates and the hydroxyl groups present in the added polyhydroxyl compounds is 2:1 to 1:1.2.

It is apparent from this equivalent ratio that the lacquer polyisocyanates according to the invention may be thermally self-crosslinking one-component binders when the concentration of hydroxyl groups chemically incorporated into the lacquer polyisocyanates corresponds to the stated equivalent ratio. The following description of suitable additives applies to this embodiment of the invention, which is less preferred.

The compositions containing the lacquer polyisocyanates according to the invention and the polyhydroxyl compounds as binders may be used as such as stoving lacquers or they may be blended with additives such as solvents, catalysts and pigments.

Suitable solvents include those previously set forth. If monohydric alcohols or phenols are used as the solvent, they are displaced during the stoving operation by the non-volatile polyhydroxyl compounds and removed, together with the blocking agent, from the reaction mixture by distillation during the stoving operation. In the preferred wire coating compositions, 15 to 75, in particular 20 to 60 wt. % solutions of the lacquer polyisocyanates and polyhydroxyl compounds are generally used.

Examples of catalysts that may be used according to the invention are described in *Kunststoffhandbuch* (ed. Becker/Braun), volume 7, *Polyurethane*, pages 92 et seq., Carl Hanser Verlag, Munich Vienna, 1983. In addition the catalysts described in DE-AS 2,626,175, column 7, line 35 to column 8, line 27 are also suitable. Organometallic catalysts are particularly suitable, in particular titanium, zinc or tin compounds, such as tetraisopropyl titanate, zinc octoate, dibutyltin oxide and dibutyltin dilaurate. The catalysts are used, if at all, in a quantity of 0.01 to 5.0, preferably of 0.1 to 3.0 wt. %, based on the weight of the blocked polyisocyanates according to the invention.

The compositions containing the binders and additives are stable in storage at room temperature or at moderately elevated temperature (up to approx. 50° C.) and, when heated to temperatures of above 60° C., preferably of 100° to 500° C. and in particular of 180° to 400° C., react with simultaneous vaporization of any volatile constituents, such as solvents, to yield crosslinked plastics.

The stoving lacquers are suitable for coating any desired heat resistant substrates, in particular glass fibers and more preferably metal wires. The stoving lacquers may be applied to the substrates using any coating technology methods and then cured within the previously disclosed temperature ranges.

In the case of the preferred wire coatings, the wires are coated using known immersion, roller application or absorbent felt methods and then cured in conventional drying ovens within the disclosed temperature ranges. When the products according to the invention are used as crosslinking agents for wire lacquer coatings, emphasis should be placed upon their outstanding solderability despite their increased heat resistance, their increased softening temperature and increased heat shock resistance, combined with excellent water resistance and a particularly high tan δ critical point of the resulting coated wires when compared with known coated wires.

Due to the excellent electrical and mechanical properties of the plastics obtained in accordance with the invention are also suitable for the production of woven insulating fabrics or for impregnating electric motors.

In the second use according to the invention the lacquer polyisocyanates according to the invention are blended and/or reacted with organic polyhydroxyl compounds e) to form binders or binder components containing hydroxyl groups and optionally blocked isocyanate groups. Polyhydroxyl compounds e) are used in quantities corresponding to an equivalent ratio of i) blocked isocyanate groups of the lacquer polyisocyanates to ii) the sum of the hydroxyl groups of component e) and the hydroxyl groups present in the lacquer polyisocyanates of 1:1.21 to 1:3, preferably of 1:1.4 to 1:2.5.

Polyhydroxyl compounds e) have a molecular weight of 62 to 350, correspond to the disclosure of polyhydroxyl compounds d) and may be identical to or different from compounds d).

In this second use compositions containing blocked isocyanate groups and free hydroxyl groups are produced in the event that the blocked isocyanate groups are not reacted or only incompletely reacted with the hydroxyl groups. If, however, it is ensured by suitable temperature control (for example heating to 120° to 200° C.) that the isocyanate groups are virtually completely reacted with the hydroxyl groups present in excess with liberation of the blocking agent, compositions containing hydroxyl groups and virtually no blocked isocyanate groups are obtained in the second use according to the invention. The liberated blocking agent (for example cresol) may act as a solvent or, if desired, be removed by distillation.

In any case, compositions are obtained in accordance with the second use which have a blocked isocyanate group content that is too low for final crosslinking. Therefore, these compositions must be blended before their final use as a binder component with known blocked polyisocyanates. These compositions may also contain the additives previously set forth.

In the following examples all parts and percentages are by weight unless otherwise indicated. The content of blocked NCO groups was calculated as "NCO", i.e., on the basis of a molecular weight of 42. The urethane group contents relate solely to the urethane groups formed by the reaction of isocyanate groups with polyhydric alcohols and thus do not include the blocked isocyanate groups formed from isocyanate groups and monohydric alcoholic or phenolic blocking agents, even though these blocked isocyanate groups are urethane groups. All data relating to the amide/imide content relate to the structural unit —CO—N= (molecular weight= 42) which is common to both groups.

EXAMPLES

Example 1

(Production)

2661 parts of cresol (commercial isomeric mixture) were added dropwise within approximately 1 hour starting at 80° C. with heating to 130° C. to 4019 parts of a polyisocyanate mixture of the diphenylmethane series having an NCO equivalent weight of 130.5, and containing 90% of diisocyanatodiphenyl-methane isomers and 10% of higher homologs. The mixture was allowed to react in the presence of 1 part of diazabicyclooctane as catalyst for approximately 8 to 15 hours at 120° to 140° C. until an NCO content of 3.9 to 4.3% was obtained ($NCO_{theor}$=3.9%). The mixture was dissolved in 2867 parts of 1-methoxy-2-propyl acetate (MPA) and 591 parts of trimellitic anhydride were added in portions at approximately 120° C. The mixture was stirred for 24 to 28 hours at 150° to 160° C. and the reaction was terminated when no further liberation of $CO_2$ as measured by a gas meter was observed. An additional 132 parts of cresol were added as solvent and a clear solution of the blocked polyisocyanate was obtained having the following properties (all data here and in the following production examples are based on solution):

| | |
|---|---|
| Concentration | 70% |
| Viscosity (23° C.) | 41,000 mPa.s |
| Free NCO content | 0.6% |
| Blocked NCO content | 10.3% |
| Amide/imide content | 2.6% |

Example 2

(Production)

1831 parts of cresol (commercial isomeric mixture) were added dropwise within approximately 1 hour starting at 80° C. with heating to 130° C. to 3161 parts of the polyisocyanate mixture described in example 1. The mixture was allowed to react in the presence of 1 part of diazabicyclooctane as catalyst for approximately 10 hours at 130° to 140° C. and then 2302 parts of MPA were added as solvent. 698 parts of trimellitic anhydride were added in portions at approximately 120° C. and the mixture was allowed to react for 24 to 48 hours at 150° to 160° C. with evolution of $CO_2$. The reaction was terminated when no further liberation of gas was observed. The solution of the blocked polyisocyanate had the following properties:

| | |
|---|---|
| Concentration | 70% |
| Free NCO content | 0.8% |
| Blocked NCO content | 9.3% |
| Amide/imide content | 4.0% |

Example 3

(Production)

1603 parts of cresol were added dropwise at 80° to 100° C. to a solution of 2981 parts of the polyisocyanate mixture described in example 1 in 4920 parts of MPA and reacted in the presence of 1 part of diazabicyclooctane as catalyst. Immediately thereafter, 767 parts of trimellitic anhydride were added in portions at 100° to 120° C. and the reaction temperature raised to 150° to 160° C. When, after approximately 40 hours, no further evolution of $CO_2$ was observed by means of a connected gas meter, 80 parts of excess cresol were added and stirred continuously for 2 hours at 120° C.

A clear solution of the blocked polyisocyanate was obtained which had the following properties:

| | |
|---|---|
| Concentration | 50% |
| Viscosity (23° C.) | 2800 mPa.s |
| Free NCO content | 0.2% |
| Blocked NCO content | 6.2% |
| Amide/imide content | 3.4% |

Example 4
(Production)

2631 parts of cresol were added dropwise within approximately 1 hour at 80° to 100° C. to 3973 parts of the polyisocyanate mixture described in example 1 and the mixture was allowed to react for approximately 4 hours at 120° to 140° C. in the presence of 1 part of diazabicyclooctane as catalyst. At an NCO content of 7.0% ($NCO_{theor}$= 3.9%), the mixture was dissolved in 2870 parts of MPA and 664 parts of pyromellitic anhydride were added in portions at 120° C. The mixture was stirred for approximately 40 hours at 150° to 160° C. until the evolution of $CO_2$, measured by means of a gas meter, had ceased. A further 130 parts of excess cresol were added and stirring was continued for 2 hours at 130° C. A clear solution of the blocked polyisocyanate was obtained which had the following properties:

| | |
|---|---|
| Concentration | 70% |
| Viscosity (23° C.) | 32,000 mPa.s |
| Free NCO content | 0.8% |
| Blocked NCO content | 10.2% |
| Imide content | 2.5% |

Example 5
(Production)

A mixture of 2079 parts of phenol, 332 parts of 1,3-butanediol and 1 part of diazabicyclooctane was added dropwise within approximately 1 hour at 80° C. to 3206 parts of 2,4- and 2,6-diisocyanatotoluene (TDI, 80:20 isomeric mixture). The mixture was allowed to react for approximately 10 hours at 130° C. until an NCO content of 5.7% was obtained ($NCO_{theor}$=5.5%) and then 3200 parts of MPA were added as solvent. 707 parts of trimellitic anhydride were added in portions and the mixture was allowed to react for approximately 40 hours at 150° C. until no further evolution of $CO_2$ was observed on a connected gas meter. An additional 800 parts of phenol were added and stirring was continued for 1 hour at 125° C. A clear solution of the blocked polyisocyanate was obtained which had the following properties:

| | |
|---|---|
| Concentration | 60% |
| Viscosity (23° C.) | 22,000 mPa.s |
| Free NCO content | 0.1% |
| Blocked NCO content | 9.3% |
| Amide/imide content | 3.1% |

Example 6
(first use according to the invention)

268 parts of the blocked polyisocyanate solution from example 1 were dissolved together with 162 parts of a solid hydroxyurethane (the reaction product of 99.9 parts of 4,4'-diisocyanatodiphenylmethane, 30.8 parts of trimethylolpropane, 16.9 parts of diethylene glycol and 14.4 parts of 1,3-butanediol; OH number 180 mg KOH/g) in a solvent mixture prepared from 285 parts of cresol and 285 parts of xylene. 10.5 parts of an aldimine based on aniline and butyraldehyde were added to the resultant solution as catalyst.

| | |
|---|---|
| Solids content | 35% |
| Viscosity (4 mm DIN cup) | 51 s (DIN 53 211) |

A copper wire having a diameter of 0.5 mm was coated with this solution by means of felt wipers in 7 passes on a model FLK 240 horizontal lacquer coating plant from Aumann, Espelkamp, FRG having an oven length of 2.40 m (slightly modified for medium thickness wire diameters) at an oven temperature of 450° C./500° C. and a speed of 23 m/min.

The lacquer coated wire was solderable within 3 seconds at 370° C. (IEC 851/part 4, test 17), the tan-δ critical point (IEC 851, part 5, test 19) was 185° C., and the softening temperature (IEC 851, part 6, 4.1.2) was 250° C. The coating exhibited increased flexibility: after 20% pre-extension, the wire was wound around a 0.5 mm cylindrical mandrel without causing cracks in the coating. Pencil hardness after exposure to solvents: 2H (IEC 851/part 4, 3.12, with the exception that ethanol was used instead of the mixture of petroleum naphtha, xylene and butanol). No hairline cracks were formed on the lacquer coated wires after extension under water.

Example 7
(first use according to the invention)

242 parts of the blocked polyisocyanate solution from example 4 were dissolved together with 181 parts of a solid hydroxyurethane (the reaction product of 111.7 parts of 4,4'-diisocyanatodiphenylmethane, 34.4 parts of trimethylolpropane, 18.8 parts of diethylene glycol and 16.1 parts of 1,3-butanediol; OH number 180 mg KOH/g) in a solvent mixture prepared from 289 parts of cresol and 288 parts of xylene. 10.5 parts of an aldimine based on aniline and butyraldehyde were added to the resultant solution as catalyst.

| | |
|---|---|
| Solids content | 35% |
| Viscosity (4 mm DIN cup) | 48 s (DIN 53 211) |

A copper wire having a diameter of 0.5 mm was coated with this solution by means of felt wipers in 7 passes on a model FLK 240 horizontal lacquer coating plant from Aumann, Espelkamp, FRG having an oven length of 2.40 m at an oven temperature of 450° C./500° C. and a speed of 23 m/min.

The lacquer coated wire was solderable within 4 seconds at 370° C. (IEC 851), the tan-δ critical point (IEC 851, part 5, test 19) was 200° C. and the softening temperature (IEC 851, part 6, 4.1.2) was 260° C. The coating exhibited increased flexibility: after 20% pre-extension, the wire was wound around a 0.5 mm cylindrical mandrel without causing cracks in the coating. Pencil hardness after exposure to solvents: 5H (IEC 851/part 4, 3.12, with the exception that ethanol was used instead of the mixture of petroleum naphtha, xylene and butanol). No hairline cracks were formed on the lacquer coated wires after extension under water.

Example 8

(second use according to the invention)

844 parts of trimethylolpropane, 334 parts of diethylene glycol, 283 parts of 1,3-butanediol, 241 parts of cresol and 626 parts of MPA were added to the blocked polyisocyanate solution from example 2 and homogenized for 4 hours at 150° C. The resultant solution had the following properties:

| | |
|---|---|
| Concentration | 68% |
| Viscosity (23° C.) | 41,000 mPa.s |
| Free NCO content | 0% |
| OH number | 176 mg KOH/g |

47% of the hydroxyl groups were available for a crosslinking reaction with an additional blocked polyisocyanate. The remaining hydroxyl groups correspond to the quantity of blocked isocyanate groups present in the lacquer polyisocyanate. The cresol added as solvent and eliminated as blocking agent was disregarded for the purposes of the OH number.

Example 9

294 parts of the solution obtained according to example 8 were dissolved together with 150 parts of a phenol-blocked polyisocyanate (the solid reaction product of and 80:20 mixture of 2,4- and 2,6-diisocyanato-toluene, trimethylolpropane, 1,3-butanediol and phenol; blocked NCO content—12%) in 278 parts of cresol and 278 parts of xylene and combined with 10.5 parts of an aldimine based on aniline and butyraldehyde as catalyst.

| | |
|---|---|
| Solids content | 35% |
| Viscosity (4 mm DIN cup) | 21 s (DIN 53 211) |

A copper wire having a diameter of 0.5 mm was coated with this solution by means of felt wipers in 7 passes on a model FLK 240 horizontal lacquer coating plant from Aumann, Espelkamp, FRG having an oven length of 2.40 m at an oven temperature of 450° C./500° C. and a speed of 23 m/min.

The lacquer coated wire was solderable within 3 seconds at 370° C. (IEC 851), the tan-δ critical point (IEC 851, part 5, test 19) was 180° C., and the softening temperature (IEC 851, part 6, 4.1.2) was 250° C. The coating exhibited increased flexibility: after 20% pre-extension, the wire was wound around a 0.5 mm cylindrical mandrel without causing cracks in the coating. Pencil hardness after exposure to solvents: 5H (IEC 851/part 4, 3.12, with the exception that ethanol was used instead of the mixture of petroleum naphtha, xylene and butanol).

Example 10

294 parts of the solution obtained according to example 8 were dissolved together with 150 parts of a cresol-blocked polyisocyanate (the solid reaction product of 4,4'-diisocyanatodiphenylmethane (MDI), trimethylolpropane, 1,6-hexanediol and cresol; blocked NCO content—11%) in 278 parts of cresol and 278 parts of xylene and combined with 10.5 parts of an aldimine based on aniline and butyraldehyde as catalyst.

| | |
|---|---|
| Solids content | 35% |
| Viscosity (4 mm DIN cup) | 21 s (DIN 53 211) |

A copper wire of having a diameter of 0.5 mm was coated with this solution by means of felt wipers in 7 passes on a model FLK 240 horizontal lacquer coating plant from Aumann, Espelkamp, FRG having an oven length of 2.40 m at an oven temperature of 450° C./500° C. and a speed of 23 m/min.

The lacquer coated wire was solderable within 3 seconds at 370° C. (IEC 851), the tan-δ critical point (IEC 851, part 5, test 19) was 190° C., and the softening temperature (IEC 851, part 6, 4.1.2) was 250° C. The coating exhibited increased flexibility: after 20% pre-extension, the wire was wound around a 0.5 mm cylindrical mandrel without causing cracks in the coating. Pencil hardness after exposure to solvents: 5H (IEC 851/part 4, 3.12, with the exception that ethanol was used instead of the mixture of petroleum naphtha, xylene and butanol). No hairline cracks were formed on the lacquer coated wires after extension under water.

Example 11

(first use according to the invention)

187 parts of the blocked polyisocyanate solution from example 1 were dissolved together with 313 parts of the solution obtained according to example 8 in 250 parts of cresol and 250 parts of xylene. 10.5 parts of an aldimine based on aniline and butyraldehyde were added to the resultant solution as catalyst.

| | |
|---|---|
| Solids content | 35% |
| Viscosity (4 mm DIN cup) | 18 s (DIN 53 211) |

A copper wire having a diameter of 0.5 mm was coated with this solution by means of felt wipers in 7 passes on a model FLK 240 horizontal lacquer coating plant from Aumann, Espelkamp, FRG having an oven length of 2.40 m at an oven temperature of 450° C./500° C. and a speed of 23 m/min.

The lacquer coated wire was solderable within 3 seconds at 370° C. (IEC 851), the tan-δ critical point (IEC 851, part 5, test 19) was 220° C., and the softening temperature (IEC 851, part 6, 4.1.2) was 270° C. The coating exhibited increased flexibility: after 20% pre-extension, the wire was wound around a 0.5 mm cylindrical mandrel without causing cracks in the coating. Pencil hardness after exposure to solvents: 5H (IEC 851/part 4, 3.12, with the exception that ethanol was used instead of the mixture of petroleum naphtha, xylene and butanol). No hairline cracks were formed on the lacquer coated wires after extension under water.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stoving lacquer containing, as binder,
   A) a blocked polyisocyanate optionally containing hydroxyl groups, which contains
      i) 0.5 to 10 wt. % of amide and/or imide structural units (calculated as —CO—N=, MW=42), ii) 5 to 20 wt. % of isocyanate groups (calculated as —NCO, MW=42) blocked with blocking agents which are monofunctional in the context of the isocyanate addition reaction and iii) 0 to 30 wt. % of chemically incorporated urethane groups (calculated as —NH—CO—O—, MW=59) obtained from the reaction of isocyanate groups with the hydroxyl groups of organic polyhydroxyl compounds, in which said blocked polyisocyanate is prepared from a polyisocyanate component having an average NCO functionality of at most 2.6, and B) a positive amount of an organic polyhydroxyl component containing oligourethanes having aliphatically bound hydroxyl groups and an OH number of 50 to 400, wherein components A) and B) are present in an amount sufficient to provide an equivalent ratio of i) blocked isocyanate groups of the blocked polyisocyanate to ii) the sum of the hydroxyl groups present in the blocked polyisocyanate and the hydroxyl groups of the polyhydroxyl compound is 2:1 to 1:1.2.

2. The stoving lacquer of claim 1 wherein said polyisocyanate component has an average NCO functionality of 2 to 2.2 and an average molecular weight of 174 to 300, and comprises one or more polyisocyanates having aromatically bound isocyanate groups.

3. The stoving lacquer of claim 1 wherein blocked polyisocyanate A) does not contain hydroxyl groups.

4. The stoving lacquer of claim 2 wherein blocked polyisocyanate A) does not contain hydroxyl groups.

5. A compound containing free hydroxyl groups and optionally blocked isocyanate groups, which is suitable for use as a binder component and which is prepared by at least partially reacting A) a blocked polyisocyanate optionally containing hydroxyl groups and containing i) 0.5 to 10 wt. % of amide and/or imide structural units (calculated as —CO—N=, MW=42), ii) 5 to 20 wt. % of isocyanate groups (calculated as —NCO, MW=42) blocked with blocking agents which are monofunctional in the context of the isocyanate addition reaction and iii) 0 to 30 wt. % of chemically incorporated urethane groups (calculated as —NH—CO—O—, MW=59) obtained from the reaction of isocyanate groups with the hydroxyl groups of organic polyhydroxyl compounds, in which said blocked polyisocyanate is prepared from a polyisocyanate having an average NCO functionality of at most 2.6, and B) a sufficient amount of an organic polyhydroxyl compound having a molecular weight of 62 to 350 to provide an equivalent ratio of i) blocked isocyanate groups of blocked polyisocyanate A) to ii) the sum of the hydroxyl groups present in blocked polyisocyanate A) and the hydroxyl groups of polyhydroxyl compound B) of 1:1.21 to 1:3.

6. The compound of claim 5 which is free from blocked polyisocyanate groups.

7. A composition containing the compound of claim 5 and a blocked polyisocyanate other than blocked polyisocyanate A).

8. A composition containing the compound of claim 6 and a blocked polyisocyanate other than blocked polyisocyanate A).

9. A composition containing the compound of claim 6 and a blocked polyisocyanate.

* * * * *